United States Patent [19]

Fathauer

[11] 3,870,990

[45] Mar. 11, 1975

[54] VEHICLE PRESENCE DETECTOR

[75] Inventor: George H. Fathauer, Decatur, Ill.

[73] Assignee: Decatur Electronics, Inc., Decatur, Ill.

[22] Filed: May 18, 1973

[21] Appl. No.: 361,770

[52] U.S. Cl. .............................................. 340/38 L

[51] Int. Cl. .......................... G08g 1/01, E01f 11/00

[58] Field of Search ............ 340/38 R, 38 L, 258 R, 340/258 C

[56] References Cited

UNITED STATES PATENTS

| | | | |
|---|---|---|---|
| 3,222,637 | 12/1965 | Gray | 340/38 L |
| 3,373,374 | 3/1968 | Marosi | 340/38 L |
| 3,375,493 | 3/1968 | Gottlieb | 340/38 L |
| 3,400,365 | 9/1968 | French | 340/38 L |
| 3,587,040 | 6/1971 | Fathauer | 340/38 L |
| 3,685,013 | 8/1972 | Brickner | 340/38 L |
| 3,818,430 | 6/1974 | Williams | 340/38 L |

*Primary Examiner*—Kathleen H. Claffy
*Assistant Examiner*—Randall P. Myers
*Attorney, Agent, or Firm*—Neuman, Williams, Anderson & Olson

[57] ABSTRACT

A vehicle presence detector is disclosed using a detector loop made to resonate at a harmonic of the oscillator driving frequency. A phase detection apparatus is included capable of detecting changes in the relative phase of two signals in a random harmonic relationship. The oscillator frequency is voltage controlled and a feedback loop from the phase detection apparatus is provided to tune the oscillator and eliminate the effect of environmental changes.

11 Claims, 2 Drawing Figures

VEHICLE PRESENCE DETECTOR

BACKGROUND OF THE INVENTION

This invention relates to presence detectors and, more specifically, to apparatus for detecting the presence of vehicles in a controlled segment of roadway.

Presence detectors in general and vehicle presence detectors in particular are well known in the art. One common form of presence detector comprises an oscillator driving a tuned circuit including a relatively large inductive loop tuned to the oscillator frequency and a phase detector for comparing the phases of the oscillator signal and the tuned circuit voltage. When an object comes within the electromagnetic field created by that loop, the inductance of the loop is altered thus changing the resonant frequency of the tuned circuit and the phase of the voltage appearing across the tuned circuit. The phase detector detects this phase change and its output may be used to drive some desired device. When used as a vehicle detector, the loop is generally one to four turns of relatively heavy gauge wire embedded underneath the portion of the roadway of interest.

The detectors of the prior art have had a number of problems associated therewith. The detectors are often located outisde where they are exposed to extremes of temperature and moisture. The inductance of the loop is subject to variations particularly with changes in the moisture content and temperature of the material in which it is embedded. The mere presence of rain or snow on the roadway in some cases altered the loop inductance sufficiently to prevent proper operation of prior vehicle detectors. The values of other components used in the circuitry of some prior detectors have also been sufficiently altered by environmental changes that the detector operation was either seriously degraded or the detector ceased to perform entirely. Circuits of the prior art which did compensate for such environmental variations often required an excessive length of time to reach a stable operating condition after power was applied thereto.

Moreover, the configuration of the loop used with such detectors is generally determined primarily by the nature of the object to be detected rather than by considerations of circuit economy or convenience. In vehicle detectors particularly, relatively large loops were required with but a few turns. In order to make the tuned circuit including the loop resonant at a reasonably low frequency, the capacitor associated therewith had to be relatively large both in circuit value and physical size. Further, it is conventional to use cables having primarily capacitive reactance for connecting the loop to the remainder of the detector circuitry. The amount of capacitance exhibited by a lead-in cable is dependent upon its length. Thus, as different installations require different lead-in cable lengths, the detector circuits will be required to operate with different amounts of lead-in cable capacitance.

It has been necessary in the past to include large capacitors within the detector circuitry, usually in parallel with the lead-in cable, to minimize the effects of variations in lead-in cable capacitance. In presence detectors of the prior art, the capacitors used to resonate the detector loops and minimize lead-in cable capacitance variations have constituted a significant portion of the volume and mass of the detector circuit apparatus. In prior art detectors it has also been necessary for the oscillator operating frequency to be adjustable over relatively wide ranges to permit the detectors to operate with a variety of loop configurations and lead-in cable capacities. The requirement of wide frequency variation meant that the oscillators were relatively unstable.

SUMMARY OF THE INVENTION

Presence detectors are provided by this invention which make use of tuned circuits which may be tuned to a harmonic of the oscillator circuit included therein and which include circuitry for detecting the phase difference between two harmonically related signals. Additionally, presence detectors of this invention may include circuitry to compensate for changes in the environment in which the detector is operated.

Thus, it is an object of this invention to provide presence detectors which may use a detector loop tuned to a harmonic of the detector oscillator frequency.

It is an object of this invention to provide phase detecting circuits for use in a presence detector capable of detecting shifts in the relative phase of two harmonically related signals.

It is an object of this invention to provide presence detectors using oscillators which need be operable over a relatively narrow frequency range.

It is an object of this invention to provide vehicle presence detectors which avoid use of the relatively large capacitors to tune the loop and minimize the effect of variations in lead-in cable capacity of prior detectors.

It is an object of this invention to provide presence detectors which automatically compensate for changes in the environment in which they operate.

It is an object of this invention to provide presence detectors capable of compensating for changes in environmental conditions which quickly reach a stable operating condition.

It is an object of this invention to provide vehicle presence detectors which fulfill all of the above-named objects and are also characterized by simplicity of design, economy in construction, and ease of operation and maintenance.

Further and additional objects of this invention will appear from the following specification and claims and the drawing appended hereto.

DESCRIPTION OF THE PREFERRED EMBODIMENT

Figure 1:
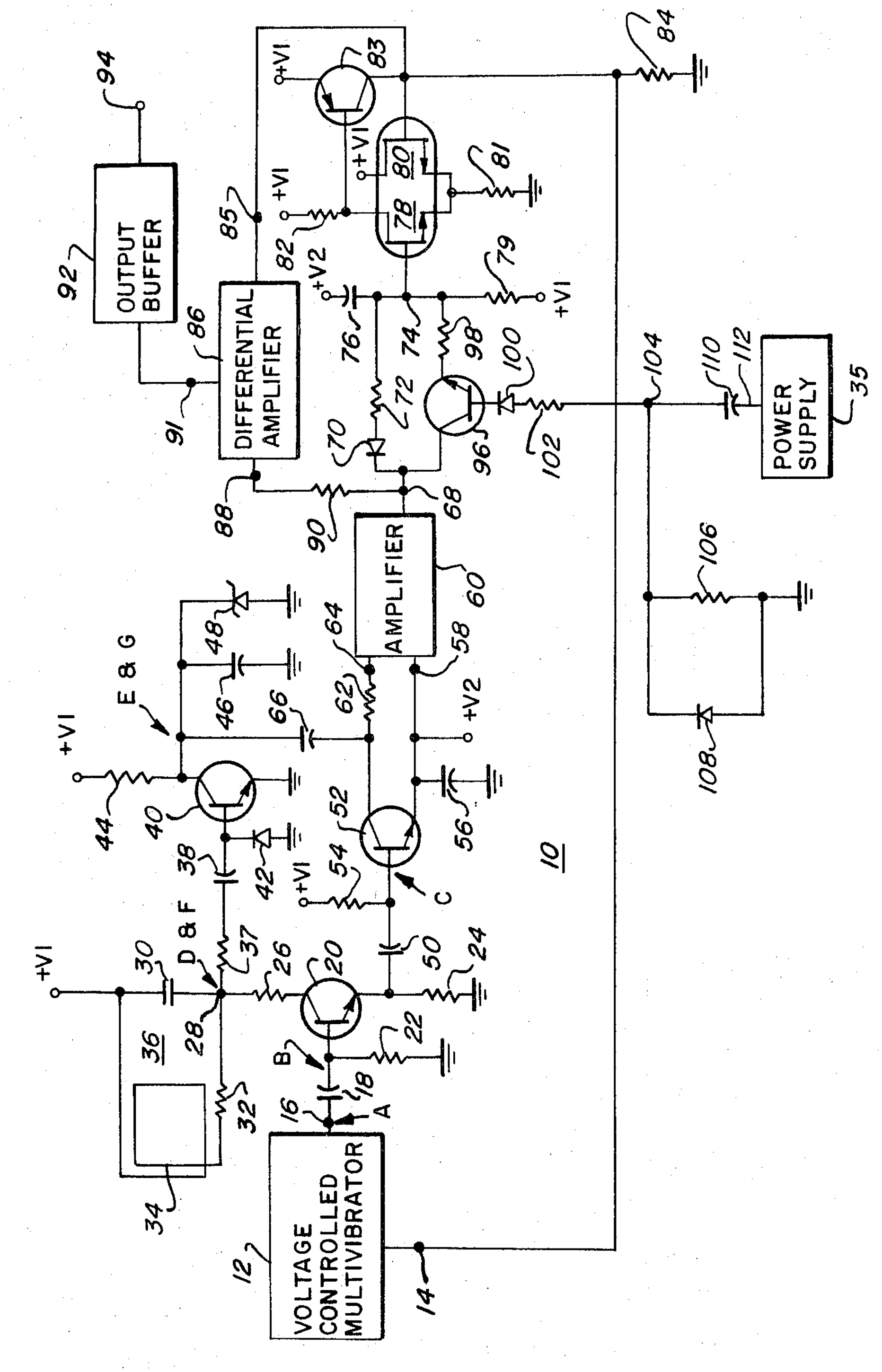
FIG. 1 is circuit diagram partly in schematic form and partly in block form of vehicle presence detector incorporating a preferred embodiment of this invention.

There is disclosed in FIG. 1 a vehicle presence detector 10 including a preferred embodiment of this invention. Those parts of the circuit there shown which have a construction which will be obvious to those of ordinary skill in the art and the detailed construction of which would not contribute to an understanding of this invention are shown in block form. Detector 10 includes an oscillator in the form of a voltage controlled multivibrator 12 having a control input terminal 14 and an output terminal 16. The multivibrator 12 produces a generally rectangularly shaped output waveform as shown at A in FIG. 2. The frequency of that output waveform may be varied in response to the voltage applied to control input terminal 14. Output terminal 16 is coupled through a capacitor 18 to the base of an NPN transistor 20 and thence to a circuit ground through a resistor 22. The emitter of transistor 20 is coupled to ground through a resistor 24 while the collector of that transistor is coupled through a resistor 26 to a circuit point 28 which circuit point is, in turn, coupled to a first positive voltage supply V1 through a capacitor 30 and also through the series combination of a resistor 32 and a detector loop 34. First positive voltage source V1 may be generated by a power supply 35. Capacitor 30 and detector loop 34 combine to form a tuned circuit 36. Detector loop 34 comprises, for example, two to five turns of No. 14 gauge wire in a rectangular shape measuring 5 by 15 feet disposed 2 to 3 inches beneath the surface of a controlled portion of the roadway. A plurality of loops may be coupled together to detect the presence of vehicles at multiple locations.

Circuit point 28 is coupled through the series combination of a resistor 37 and a capacitor 38 to the base of an NPN transistor 40. The base of transistor 40 is connected to the cathode of a diode 42 having its anode connected to a circuit ground. The emitter of transistor 40 is connected directly to ground and the collector of that transistor is coupled through a resistor 44 to first positive voltage supply V1. The collector of transistor 40 is also coupled to ground through a capacitor 46. A zener diode 48 is included in the circuit having its cathode connected to the collector of transistor 40 and its anode connected to ground.

The emitter of transistor 20 is coupled through a capacitor 50 to the base of an NPN transistor 52 which is also coupled to first positive voltage supply V1 through a resistor 54. The emitter of transistor 52 is coupled to ground through a capacitor 56 and directly connected to a second positive voltage supply V2. Second positive voltage supply V2 supplies a voltage of lower magnitude than that supplied by first positive voltage supply V1 and may also be generated by power supply 35. The emitter of transistor 52 is also connected to a first input terminal 58 of a D. C. amplifier 60. The collector of transistor 52 is coupled through a resistor 62 to a second input terminal 64 of D. C. amplifier 60. A capacitor 66 couples the collectors of transistors 40 and 52. Amplifier 60 detects the D. C. component of the difference between the voltages appearing at its first and second input terminals 58 and 64, respectively, and supplies an amplified version of that D. C. component at an output terminal 68. It is such that when the voltage at input terminal 64 is greater than that at input terminal 58 and is increasing in a positive direction, the voltage at the output terminal 68 is positive and increasing in a positive direction, but when a zero volt D. C. signal appears between terminals 58 and 64, a voltage approximately equal to that of second positive voltage supply V2 appears at terminal 68.

Output terminal 68 is connected to the cathode of a diode 70. The anode of that diode is coupled through a resistor 72 to a circuit point 74 which circuit point is also connected to the gate element of an N channel field effect transistor 78 and coupled through a capacitor 76 to second positive voltage supply V2 and through a resistor 79 to first positive voltage supply V1.

The source of transistor 78 is coupled to the source element of an N channel field effect transistor 80. Transistors 78 and 80 are a matched pair in close physical association. Their source elements are coupled to ground through a resistor 81. The drain element of transistor 80 is connected to first positive voltage supply V1 and the drain element of transistor 70 is coupled to the same voltage supply V1 through a resistor 82 and to the base of a PNP transistor 83. The emitter of transistor 83 is connected to first positive voltage supply V1 and the collector is connected to the gate of transistor 80 and coupled to ground through a resistor 84. The gate element of transistor 80 is connected both to the control input terminal 14 of voltage controlled multivibrator 12 and to a first input 85 of a differential amplifier 86. A second input 88 of differential amplifier 86 is coupled to output terminal 68 of amplifier 60 through a resistor 90. Differential amplifier 86 detects the difference between the voltages present at first and second input terminals 85 and 88 and presents an amplified version of that difference signal at an output terminal 91. Ouput terminal 91 is coupled through an output buffer stage 92 to a vehicle detector output terminal 94. Output buffer 92 may be comprised of one or more isolating amplifier stages or a relay having one or more pairs of contacts forming the detector output.

Figure 2:
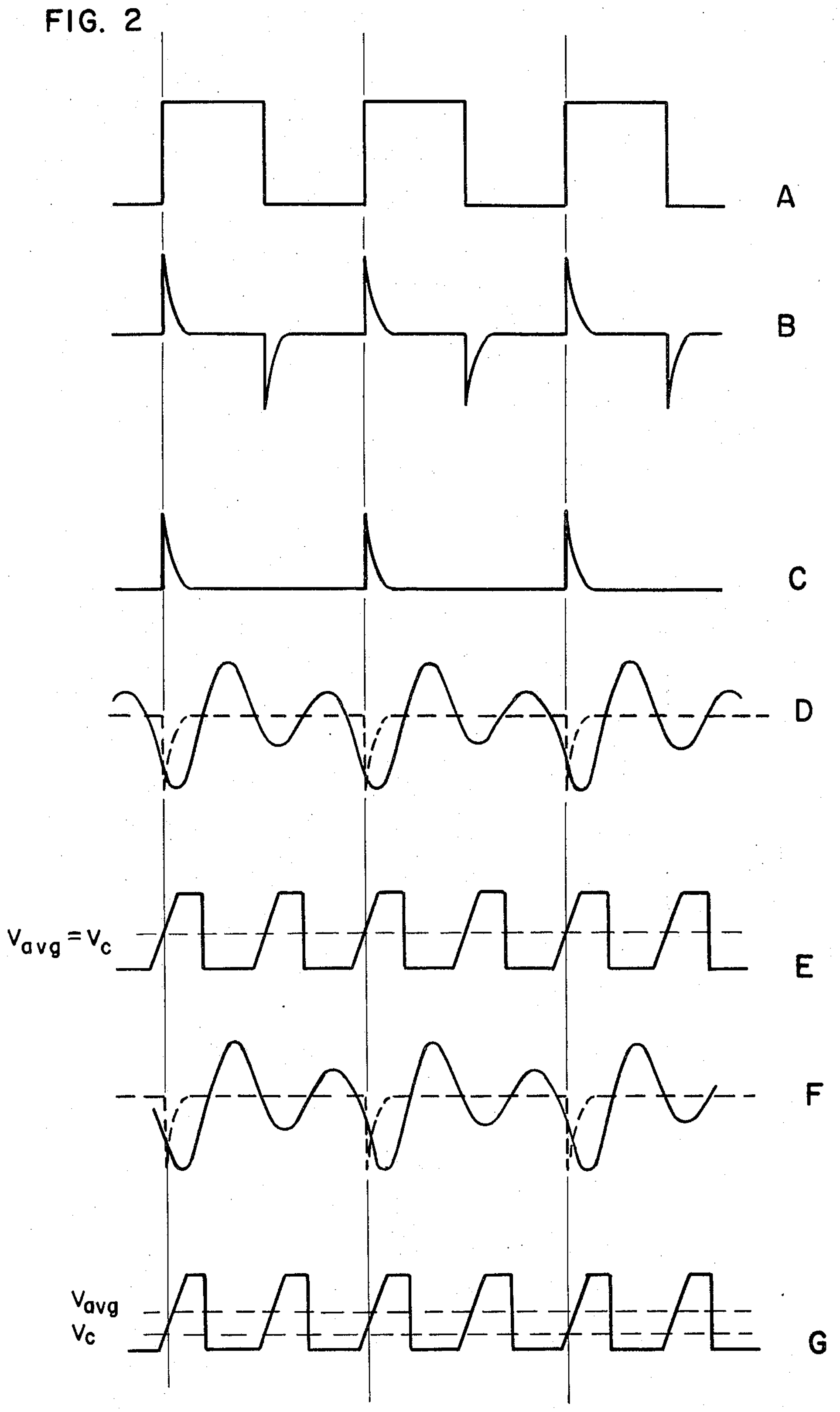
FIG. 2 illustrates a series of waveforms useful in explaining the operation of the circuit of FIG. 1.

The operation of the circuit as thus far described will be discussed in conjunction with the waveforms shown in FIG. 2. For each of those waveforms time is taken as the horizontal axis. Each waveform is drawn with the same time reference and the same time scale so that events shown at the same horizontal position occur at the same time. The vertical axis of each waveform is selected arbitrarily and solely for convenience of drawing. D. C. levels are in some instances disregarded. The index letters in FIG. 1 indicate the points in the circuit at which the correspondingly indexed waveforms of FIG. 2 appear. As mentioned, a generally rectangularly shaped waveform as shown at A appears at the output terminal 16 of voltage controlled multivibrator 12. Capacitor 18 and resistor 22 form a differentiating network so that a wave having the general appearance of waveform B appears at the base of transistor 20. Since no forward bias is applied to the base-emitter junction of that transistor, only the positive going peaks are passed through it. Transistor 20 acts as a current amplifier causing a current having the general shape of waveform C to be present at both the emitter of transistor 20 and the base of transistor 52. A current having the general shape of an inverted version of waveform C appears at circuit point 28. That waveform is shown in dashed lines at D of FIG. 2. Tuned circuit 36 has a resonant frequency at approximately the operating frequency of voltage controlled multivibrator or a harmonic thereof. The current pulses applied to that tuned circuit cause it to ring at approximately its resonant frequency. When the voltage controlled multivibrator is properly adjusted in frequency, as will be subsequently explained, so that an in-phase condition exists, and if the resonant frequency of the tuned circuit 36 is approximately twice the multivibrator operating frequency, the voltage at circuit point 38 will have approximately the shape shown in solid lines at D. That voltage is applied to the base of transistor 40. Diode 42 and the base-emitter junction of transistor 40 effectively clip waveform D.

Since no forward bias is applied to the base of transistor 40, the emitter-collector circuit of that transistor is conductive only when a positive voltage is present at the base of transistor 40, i.e., during the positive portions of the voltage waveform D. When transistor 40 is conductive, the voltage at its collector will be at the potential of circuit ground, zero volts. When the voltage at the base of transistor 40 is negative, its collector-emitter is nonconductive and the voltage at its collector rises as capacitor 46 charges toward the potential of positive supply V1 through resistor 44. The rate at which that collector voltage rises is determined by the potential of first positive voltage supply V1 and the values of resistor 44 and capacitor 46. Zener diode 48 limits the voltage rise at the transistor 40 collector to the reverse breakdown voltage of that diode. Thus, when the collector voltage reaches the zener reverse breakdown voltage, it is clamped to that level until transistor 40 again becomes conductive. Thus, a sawtooth wave having the general shape of waveform E is generated at the collector of transistor 40 and transmitted through capacitor 66 to the collector of transistor 52. Capacitor 66 removes the D. C. component from the sawtooth waveform so that its average value over one or more complete cycles is aproximately as shown as $V_{AVG}$ at E. The terms "sawtooth wave" and "sawtooth waveform" as used in this specification and the appended claims are intended to include any wave or waveform having significant slope of absolute value greater than zero but less than infinity. For example, it will be clear that the positive going portions of the waveform generated by transistor 40 and its associated components will not increase linearly with time but, rather, exponentially in accord with the well-known manner of charging a capacitor. Moreover, the waveform is truncated by zener diode 48. Nevertheless, the waveform present at the collector of transistor 40 is referred to as a sawtooth wave or sawtooth waveform.

The waveform C at the base of transistor 52 causes that transistor to be conductive only during the peaks of the positive pulses or spikes thereof. The base-emitter junction of transistor 52 clamps the peaks of the waveform C at that base to a voltage slightly greater than that of second positive voltage supply V2. When capacitor 50 is charged by the pulses applied to it, transistor 52 is thus normally biased off. However, while transistor 52 is conductive, that portion of the sawtooth waveform appearing at the collector of that transistor is clamped to the potential of second positive supply V2. The clamping voltage level is represented in E of FIG. 2 as $V_c$. If the relative phasing of the spikes of waveform C and the tuned circuit voltage of waveform D are as shown, transistor 52 will clamp the average value of the sawtooth waveform present at its collector to the second positive voltage supply potential and $V_{AVG}$ will equal $V_c$. In this state, the D. C. voltage present between amplifier input terminals 58 and 64 is zero, and the output of amplifier 60 is at the potential of second positive voltage supply V2.

When an automobile comes within the field of detector loop 34, the inductance of that loop is lowered and the resonant frequency of the tuned circuit including capacitor 30 and detector loop 34 is shifted above that of the multivibrator so that the voltage waveform present at circuit point 28 lags that which is produced in the in-phase case. The general shape of the resultant waveform is shown in solid lines at F and is seen to lag the current waveform as shown dashed. The generated sawtooth waveform thus also lags that which is produced in the in-phase case and its general appearance is shown at G. However, the relative timing of the pulses applied to the base of transistor 52 will remain unchanged as at C. Thus, the sawtooth waveform present at the collector of transistor 52 will be clamped at a lower value than the in-phase case, at $V_c$ as shown in G. The average value of the sawtooth, $V_{AVG}$, will then exceed the clamping level, $V_c$, as shown and a positive D. C. signal will be applied to the input terminals 58 and 64 of amplifier 60 causing the potential at output terminal 68 to rise.

It will thus be apparent that a positive voltage will be present at output terminal 68 having a magnitude dependent upon the phase shift induced in the voltage waveform at circuit point 28 by alterations in the inductance of detector loop 34. That voltage is applied directly to input terminal 88 of differential amplifier 86. It is also used to control the state of charge of capacitor 76. When the potential at output terminal 68 is below that present at circuit point 74, capacitor 76 discharges through resistor 72 and diode 70 so that the potential at circuit point 74 tends toward the potential at output terminal 68. When the potential at output terminal 68 is above that present at circuit point 74, capacitor 76 charges through resistor 79 so that the potential at circuit point 74 tends toward that of first positive voltage supply V1. For the described process to occur, resistor 79 must have a considerably higher resistance than resistor 72 and in one embodiment of this invention it has been found convenient for resistor 79 to have a resistance approximately three orders of magnitude larger than that of resistor 72.

Transistors 78, 80, and 83 are used as a high input impedance isolation amplifier, the potential at the gate of transistor 80 very closely tracking the potential at circuit point 74. The potential at the gate of transistor 80 is applied to input 85 of differential amplifier 86. It will be apparent that capacitor 76 performs the function of a low pass filter for the output of amplifier 60. When a rapid change in the inductance of detector loop 34 occurs, as when an automobile drives into the vicinity of the detector loop 34, the output of D. C. amplifier 68 and the signal at input 88 of the differential amplifier will change relatively rapidly. However, the voltage at circuit point 74 will change only relatively slowly, dependent upon the relative impedance values of resistors 72 and 79 and capacitor 76, so that a voltage difference will be applied to input terminals 85 and 88 cuasing a change in the signal present at the detector output terminal 94. When a relatively slow change in the inductance of detector loop 34 occurs, as when the moisture content or temperature of the material within which it is imbedded varies, or, equivalently, when capacitor 30 or any of the frequency determining elements within voltage controlled multivibrator 12 changes value from warmup, aging, environmental changes or other relatively slowly varying phenomena, the voltage at circuit point 74 will follow the voltage at output terminal 68 relatively closely so that no significant voltage difference will exist between input terminals 85 and 88 of differential amplifier 86 and the signal change at detector output terminal 94 will not occur.

The voltage present at the gate of transistor 80 is also used as a feedback signal to control the operating frequency of voltage controlled multivibrator 12. Thus, the feedback loop is operative to control the multivibrator frequency only in response to relatively slowly varying changes in the inductance of detector loop 34 or other relatively slowly varying phenomena as referred to in the immediately preceding paragraph. It will be noted that the value of that feedback signal will be the same no matter what the harmonic relationship between the frequency of the multivibrator operation and the resonant frequency of tuned circuit 36. Looking at waveforms C–E, for instance, the sole determinant of the relative timing of the sawtooth waveform in E is the negative going one-half cycle of the waveform appearing at circuit point 28 including the time at which the spikes of waveform C occurs. It makes no difference how many cycles of the voltage waveform at circuit point 28 occur between the spikes of D. Thus, the circuit can come to a stable operating condition with the multivibrator operating at a fixed frequency at either the resonant frequency of tuned circuit 36 or a subharmonic thereof. This has at least three desirable effects. The frequency range over which multivibrator 12 must operate in order for the circuit to be usable with a wide variety of loop configurations and lead-in cable lengths is reduced, allowing the multivibrator to be more stable. With a selected multivibrator operating frequency, capacitor 30 can be made very much smaller than it would have to be if tuned circuit 35 were required to resonate at the multivibrator operating frequency. Further, the time required for the detector circuit 10 to come to a stable operating condition, as would occur immediately after the application of power to it, is considerably reduced if the multivibrator can lock onto a plurality of different frequencies rather than one single frequency.

In the vehicle detector 10 of FIG. 1, a further provision is made to shorten the time required for it to come to a stable operating condition upon application of power. An NPN transistor 96 has its collector connected to amplifier output terminal 68 and its emitter coupled through resistor 98 to circuit point 74. The base of that transistor is connected to the cathode of a diode 100 which has its anode coupled through a resistor 102 to a circuit point 104. That circuit point is coupled to ground through the parallel combination of a resistor 106 and a diode 108, diode 108 being poled for high positive conductivity away from ground. Circuit point 104 is coupled through a capacitor 110 to a circuit point 112 in power supply 35 which goes from zero potential to a positive potential when power is applied to the supply 35. Resistor 98 has a resistance very much lower than that of resistor 72, perhaps three orders of magnitude lower.

When power is initially applied to power supply 35, a positive pulse is applied to the base of transistor 96 of sufficient magnitude to cause the collector/emitter circuit of that transistor to become conductive so that circuit point 74 is coupled to amplifier output terminal 68 through resistor 98. The relatively smaller magnitude of resistor 98 relative to resistor 72 permits the potential at circuit point 74 to follow the potential at output terminal 68 so that the feedback loop controlling the frequency of multivibrator 12 has a faster response time. The positive pulse at the base of transistor 98 decays with time over a period dependent upon the relative magnitude of capacitor 110 and the resistance of its discharge path. After that pulse has decayed, transistor 98 becomes nonconductive removing the effect of resistor 98 from the circuit. Further, before power is supplied to the detector circuit, no charge is present on capacitor 50 and transistor 52 is biased on supplying a zero volt D. C. signal to input terminals 58 and 64. As mentioned, this results in a positive voltage at terminal 68 approximately equal to that of second positive voltage supply V2. Thus circuit point 74 is initially established through transistor 96 at a voltage intermediate the extremes permitted. This insures that the detector circuit will have a large tuning capability in either direction. When capacitor 50 becomes fully charged, the circuit will commence its normal operation as discussed above.

It will thus be seen that a presence detector has been provided which fulfills all of the above-mentioned objects. It will be obvious that certain modifications of the specific embodiment disclosed may be made without departing from the spirit and scope of this invention. For example, the various details of the circuitry used to construct the apparatus of this invention are subject to wide variation. Numerous additional features and refinements may be added to the circuitry shown without departing from the spirit and scope of this invention.

While a preferred embodiment of this invention is shown above, it will be understood, of course, that the invention is not to be limited thereto. It is comtemplated, therefore, by the appended claims to cover any such modifications as fall within the true spirit and scope of this invention.

I claim:

1. A presence detector circuit for operation in conjunction with a detector loop and comprising:
- a source of electrical pulses;
- circuit means for coupling to said detector loop to form a tuned circuit and producing an output signal in response to said electrical pulses;
- clamping means coupled to said source and said circuit means for clamping the portion of said output signal occurring at predetermined times relative to the occurrence of said pulses at a predetermined value;
- means for producing an electrical signal representative of an average value of said clamped output signal; and
- output means for providing an indication of the presence of an object in response to changes in said electrical signal.

2. The presence detector of claim 1 wherein said circuit means comprises sawtooth wave generation means coupled to said tuned circuit for generating a sawtooth output signal in accord with the response of said tuned circuit to said electrical pulses.

3. The presence detector of claim 2 wherein said clamping means is coupled to said sawtooth wave generation means and clamps the portion of said sawtooth output signal occurring at predetermined times relative to the occurrence of said pulses at a predetermined value.

4. The presence detector of claim 3 wherein said predetermined times are simultaneous with the occurrence of said pulses.

5. The presence detector of claim 1 wherein said electrical pulse source has a variable frequency and said presence detector further comprises:
- low pass circuitry means coupled to said electrical signal producing means for low pass filtering said electrical signal; and
- feedback circuitry means coupled to said low pass filtering means for controlling the frequency of said variable frequency source in response to the low pass filtered electrical signal.

6. The presence detector of claim 5 further comprising a differential amplifier having two inputs and an output, one of said inputs being coupled to said electrical signal producing means and the second of said inputs being coupled to said low pass circuitry means, and a detector circuit output stage coupled to said differential amplifier output.

7. The presence detector of claim 6 wherein said low pass circuitry means comprises a capacitor arranged to assume a charge related to the value of said electrical signal through a first resistive path and said presence detector further comprises a second resistive path for altering the charge on said capacitor having a lower resistance than the resistance of said first path and means for removing the effect of said second resistive path from said circuit a short time after power is applied to said presence detector circuit.

8. The presence detector of claim 1 wherein said electrical pulse source has a variable frequency and comprises a voltage controlled multivibrator and a differentiating circuit coupled to the output of said multivibrator circuit.

9. The presence detector of claim 8 wherein said circuit means and said clamping means are coupled to said differentiating circuit.

10. A presence detector circuit for detecting the presence of motor vehicles comprising:

a voltage controlled multivibrator;

a differentiating circuit coupled to the output of said voltage controlled multivibrator;

a tuned circuit including a detector loop coupled to an output of said differentiating circuit;

a sawtooth wave circuit coupled to said tuned circuit and generating at an output a sawtooth wave in accord with the response of said tuned circuit to said differentiating circuit output;

a clamping circuit coupled to said differentiating circuit output and said sawtooth wave circuit output for clamping those portions of said sawtooth wave occurring at predetermined times relative to the output of said differentiating circuit to a predetermined value;

output circuit means coupled to said clamping circuit for producing a detector output signal indicating the presence of a vehicle in response to changes in an average value of said clamped sawtooth wave.

11. The presence detector of claim 10 further comprising:

a low pass filter circuit coupled to said clamping circuit for low pass filtering the average value of said clamped sawtooth wave; and a feedback circuit coupling the output of said low pass filter circuit to said voltage controlled multivibrator and controlling the operating frequency of said voltage controlled multivibrator.

* * * * *